(12) United States Patent
Liu et al.

(10) Patent No.: US 9,568,953 B2
(45) Date of Patent: Feb. 14, 2017

(54) DISPLAY DEVICE, PORTABLE ELECTRONIC DEVICE USING THE SAME AND MANUFACTURING METHOD

(71) Applicants: SHENZHEN FUTAIHONG PRECISION INDUSTRY CO., LTD., Shenzhen (CN); FIH (HONG KONG) LIMITED, Kowloon (HK)

(72) Inventors: Xiao-Kai Liu, Shenzhen (CN); Chang-Hai Gu, Shenzhen (CN); Po-Feng Ho, New Taipei (TW)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 68 days.

(21) Appl. No.: 14/555,593

(22) Filed: Nov. 27, 2014

(65) Prior Publication Data

US 2015/0153782 A1 Jun. 4, 2015

(30) Foreign Application Priority Data

Nov. 30, 2013 (CN) .......................... 2013 1 0621958

(51) Int. Cl.
*G06F 1/16* (2006.01)
*B29D 99/00* (2010.01)
*B29K 19/00* (2006.01)
*B29C 45/16* (2006.01)

(52) U.S. Cl.
CPC ........... *G06F 1/1656* (2013.01); *B29D 99/006* (2013.01); *B29C 45/1615* (2013.01); *B29C 45/1671* (2013.01); *B29K 2019/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,304,837 B2* | 12/2007 | Lo | ........................ | G06F 1/1601 248/313 |
| 7,633,747 B2* | 12/2009 | Yang | ..................... | G06F 1/1626 345/173 |
| 7,697,269 B2* | 4/2010 | Yang | ...................... | B29C 65/58 361/679.01 |
| 2011/0216486 A1* | 9/2011 | Ho | .......................... | H05K 5/00 361/679.01 |
| 2011/0255220 A1* | 10/2011 | Liu | ..................... | H04M 1/0249 361/679.01 |
| 2012/0223071 A1* | 9/2012 | Hsiung | ............... | H04M 1/0283 220/4.01 |

(Continued)

FOREIGN PATENT DOCUMENTS

| | | |
|---|---|---|
| CN | 202931395 U | 5/2015 |
| TW | M455921 U1 | 6/2013 |
| TW | 201346383 A | 11/2013 |

*Primary Examiner* — Lisa Lea Edmonds
(74) *Attorney, Agent, or Firm* — Zhigang Ma

(57) ABSTRACT

A display device includes a display, a receiving member, and a buffer member. The receiving member includes a peripheral wall. The buffer member is attached to the receiving member. The display is received in an interior of the peripheral wall of the receiving member and the buffer member is positioned at an exterior of the peripheral wall of the receiving member.

15 Claims, 4 Drawing Sheets

(56) References Cited

U.S. PATENT DOCUMENTS

| | | | |
|---|---|---|---|
| 2013/0126372 A1* | 5/2013 | Song | G06F 1/1626 |
| | | | 206/320 |
| 2013/0153457 A1* | 6/2013 | Liang | H04B 1/3888 |
| | | | 206/521 |
| 2013/0170159 A1* | 7/2013 | Jiang | H04M 1/0249 |
| | | | 361/753 |
| 2014/0118905 A1* | 5/2014 | Chung | A45C 11/00 |
| | | | 361/679.01 |
| 2014/0152890 A1* | 6/2014 | Rayner | G06F 1/1626 |
| | | | 348/376 |

* cited by examiner

DISPLAY DEVICE, PORTABLE ELECTRONIC DEVICE USING THE SAME AND MANUFACTURING METHOD

CROSS-REFERENCE TO RELATED APPLICATIONS

This application claims priority to Chinese Patent Application No. 201310621958.8 filed on Nov. 30, 2013, the contents of which are incorporated by reference herein.

FIELD

The disclosure generally relates to a display device, a portable electronic device using the same and a method for manufacturing the portable electronic device.

BACKGROUND

Portable electronic devices, such as mobile phones, laptops, or personal digital assistants (PDAs), commonly have displays incorporated therein. However, the display is easily damaged if the device is dropped. To buffer the display, a foam is positioned under the display.

BRIEF DESCRIPTION OF THE DRAWINGS

Implementations of the present technology will now be described, by way of example only, with reference to the attached figures.

DETAILED DESCRIPTION

Figure 1:
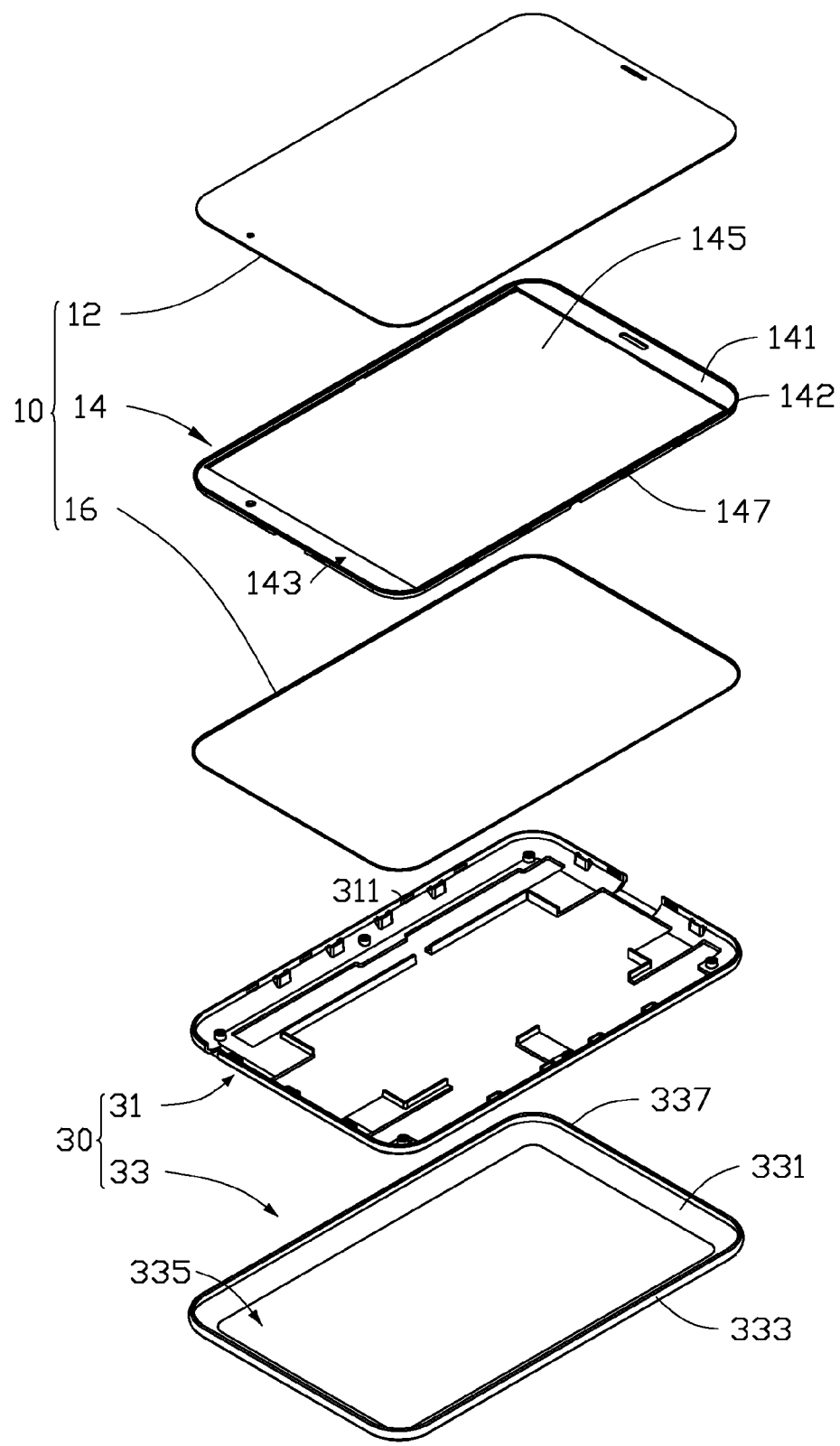
FIG. 1 is an exploded, isometric view of an embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a portable electronic device 100. The portable electronic device 100 may be a mobile phone, a personal digital assistant (PDA), or a handheld computer. The portable electronic device 100 includes a display device 10 and a housing 30. The housing 30 is configured to receive the display device 10.

The display device 10 includes a display 12, a receiving member 14, and a buffer member 16. The receiving member 14 is configured to receive the display 12 and includes a bottom surface 141 and a peripheral wall 142. The peripheral wall 142 extends substantially perpendicularly from a periphery of the bottom surface 141 to form a receiving space 143 with the bottom surface 141. The display 12 is positioned at an interior of the peripheral wall 142 and is received in the receiving space 143. An opening 145 is defined at the bottom surface 141. In this embodiment, the opening 145 is substantially rectangular and is communicated with the receiving space 143. The opening 145 is configured to receive electronic elements (not shown) of the portable electronic device 100. A plurality of latching blocks 147 protrude from the peripheral wall 142. The latching blocks 147 are configured to latch the display device 10 to the housing 30.

The buffer member 16 is attached to, bonded with, or assembled with the receiving member 14. The buffer member 16 is positioned at an exterior of the peripheral wall 142 of the receiving member 14. When the display device 10 is assembled to the housing 30, the buffer member 16 is positioned between the display device 10 and the housing 30 to seal a gap formed between the display device 10 and the housing 30, thereby preventing outside contamination, such as water, vapor and dust, from entering the portable electronic device 100. In this embodiment, the buffer member 16 is substantially wedge-shaped and includes a resisting surface 161 and a first inclined surface 163 (see FIG. 4). The resisting surface 161 is configured to resist the outside of the peripheral wall 142 and the first inclined surface 163 is configured to resist the housing 30.

The housing 30 includes a main body 31 and a cover 33. The main body 31 is attached to, bonded with, or assembled with the cover 33. The main body 311 is substantially frame-shaped and is made of plastic. The plastic can be polycarbonate (PC), or polymethyl methacrylate (PMMA). The main body 31 is configured to receive the receiving member 14 of the display device 100. A plurality of latching grooves 311 are defined at the main body 31 and are latched with the latching blocks 147 of the receiving member 14.

The cover 33 has a shape corresponding to a shape of the main body 31 and is configured to improve strength of the main body 31. The cover 33 is substantially frame-shaped and includes a plate body 331 and a peripheral edge 333. The peripheral edge 333 extends substantially perpendicularly from a periphery of the plate body 331 to form a receiving groove 335. The peripheral edge 333 forms a second inclined surface 337. The second inclined surface 337 is spaced apart from the peripheral wall 141 of the receiving member 14. Thereby, a gap 339 (see FIG. 4) is formed between the second inclined surface 337 and the peripheral wall 141 of the receiving member 14. When the buffer member 16 is positioned between the gap 339, the first inclined surface 163 resists the second inclined surface 337 and the resisting surface 161 resists the peripheral wall 142 of the receiving member 14, thereby sealing the gap 339 between the display device 10 and the housing 30.

In this embodiment, the receiving member 14 is made of resin selected one or more from a group consisting of polycarbonate (PC), Acrylonitrile Butadiene Styrene (ABS), and their modified materials. The main body 31 is also made of resin selected one or more from a group consisting of PC, ABS, and their modified materials. The buffer member 16 is made of rubber selected one or more from a group consisting of dimethyl silicone rubber (MQ), methylvinyl silicone rubber (VMQ), methyl vinyl Phenyl Polysiloxane rubber (PVMQ), and their modified materials.

A method for manufacturing the portable electronic device 100 is described as follows.

Firstly, a metal sheet is provided. The metal sheet is punched to form the cover 33 having a predetermined shape. In this embodiment, the cover 33 includes the plate body 331 and the peripheral edge 333. A first injection mold is provided. The cover 33 is placed in a die chamber of the first injection mold. Molten ABS material is injected and flows through the cover 33 to form the main body 31. After the first injection molding process, the main body 31 is tightly bonded to the cover 33.

Next, the display 12 is placed in a first die chamber of a second injection mold. Molten PC flows along the exterior of the display 12 to form the receiving member 14 with the receiving groove 143. After the second injection molding process, the display 12 is tightly bonded to the receiving member 14.

The display 12 with the receiving member 14 is placed in a second die chamber of the second injection mold. Molten rubber flows along the peripheral wall 142 of the receiving member 14 to form the buffer member 16. After the third injection molding process, the buffer member 16 is tightly bonded to the display 12 and the receiving member 14, thereby forming the display device 10.

Figure 2:
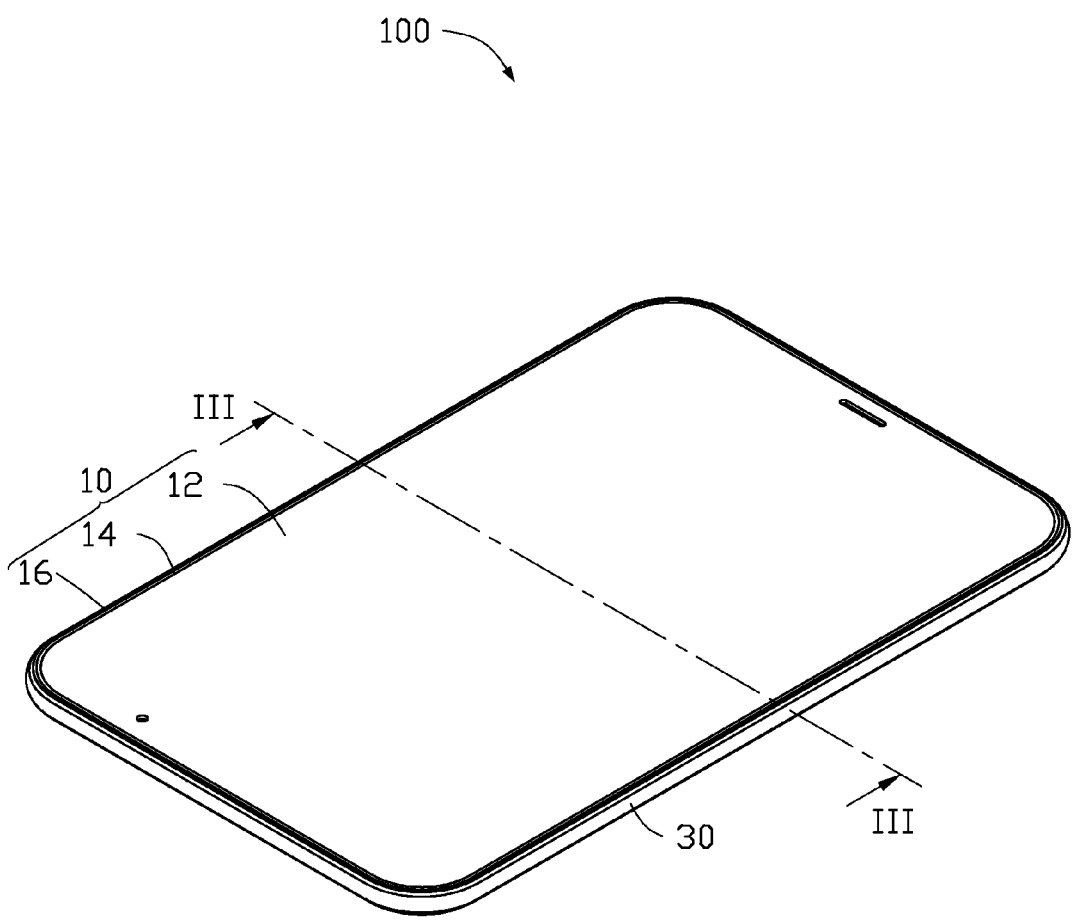
FIG. 2 is an assembled, isometric view of the portable electronic device of FIG. 1.
Figure 3:
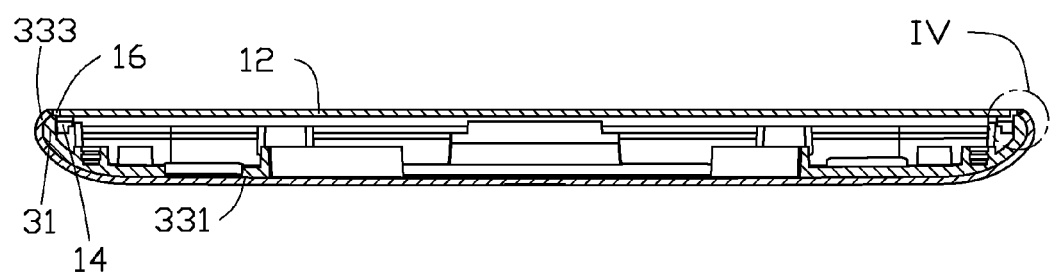
FIG. 3 is a cross-sectional view taken along line III-III of FIG. 2.

FIGS. 2 and 3 show an assembly of the display device 10 and the housing 30. In detail, the latching blocks 147 of the receiving member 14 are aligned with the latching grooves 311 of the main body 31. Then, the latching blocks 147 are latched with the latching grooves 311 for assembling the display device 10 to the housing 30.

Figure 4:
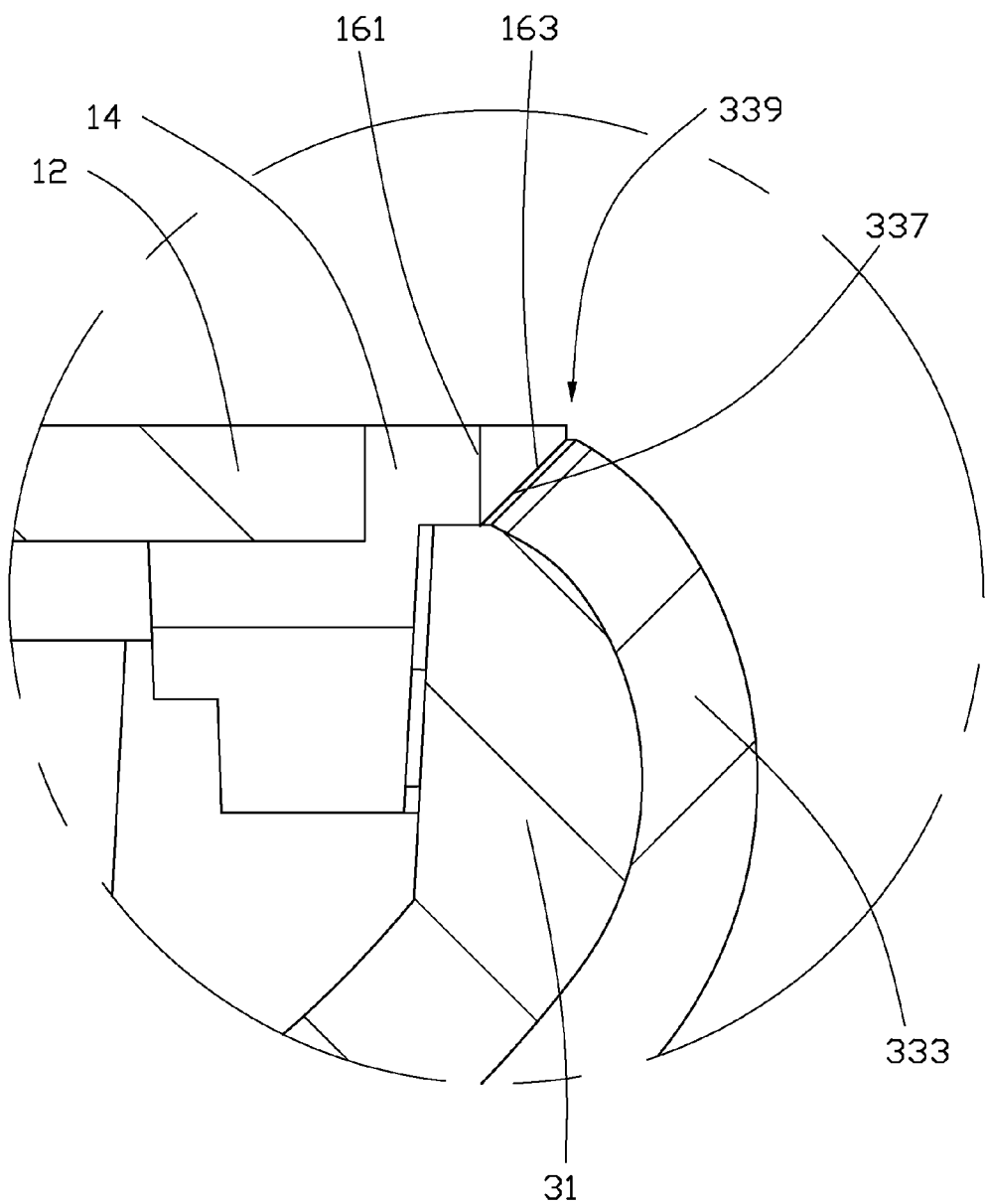
FIG. 4 is an enlarged view showing area IV of FIG. 3.

FIG. 4 illustrates that the buffer member 16 is received in the gap 339 formed by the second inclined surface 337 and the peripheral wall 141 of the receiving member 14. That is, the resisting surface 161 of the buffer member 16 resists the peripheral wall 141 of the receiving member 14 and the first inclined surface 163 of the buffer member 16 abuts against the second inclined surface 337 of the cover 33. Thus, the portable electronic device 100 is completely assembled.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device comprising:
   a housing; and
   a display device received in the housing, the display device comprising:
      a display;
      a receiving member comprising a peripheral wall; and
      a buffer member attached to the receiving member, wherein the buffer member is substantially wedge-shaped and comprises a resisting surface and a first inclined surface, the resisting surface is configured to resist the exterior of the periphery wall;
      wherein the display is received in an interior of the peripheral wall of the receiving member, the buffer member is positioned at an exterior of the peripheral wall of the receiving member and resists the housing.

2. The portable electronic device of claim 1, wherein the receiving member further comprises a bottom surface, the peripheral wall extends perpendicularly from a periphery of the bottom surface to form a receiving space with the bottom surface, the display is received in the receiving space.

3. The portable electronic device of claim 1, wherein a plurality of latching blocks protrude from the peripheral wall, the housing comprises a main body, the main body defines a plurality of latching grooves, and the latching grooves are latched with the latching blocks to latch the display device to the housing.

4. The portable electronic device of claim 3, wherein the housing further comprises a cover, the cover is bonded with the main body to improve strength of the main body.

5. The portable electronic device of claim 4, wherein the cover comprises a plate body and a peripheral edge, the peripheral edge extends substantially perpendicularly from a periphery of the plate body, a gap is formed between the peripheral edge of the cover and the peripheral wall of the receiving member, the buffer member is positioned at the gap.

6. The portable electronic device of claim 5, wherein the peripheral edge forms a second inclined surface, the resisting surface resists the peripheral wall and the first inclined surface resists the second inclined surface.

7. The portable electronic device of claim 3, wherein the receiving member and the main body are both made of resin selected one or more from a group consisting of polycarbonate (PC), Acrylonitrile Butadiene Styrene (ABS), and their modified materials.

8. A portable electronic device comprising:
   a housing; and
   a display device received in the housing, the display device comprising:
      a display;
      a receiving member comprising a peripheral wall; and
      a buffer member attached to the receiving member, the buffer member made of ubber selected one or more from a group consisting of dimethyl silicone rubber (MQ), methylvinyl silicone rubber (VMQ), methyl vinyl Phenyl Polysiloxane rubber (PVMQ), and their modified materials;
      wherein the display is received in an interior of the peripheral wall of the receiving member, the buffer member is positioned at an exterior of the peripheral wall of the receiving member and resists the housing.

9. The portable electronic device of claim 8, wherein the buffer member is substantially wedge-shaped and comprises a resisting surface and a first inclined surface, the resisting surface is configured to resist the exterior of the periphery wall.

10. The portable electronic device of claim 9, wherein a plurality of latching blocks protrude from the peripheral wall, the housing comprises a main body, the main body defines a plurality of latching grooves, and the latching grooves are latched with the latching blocks to latch the display device to the housing.

11. The portable electronic device of claim 10, wherein the housing further comprises a cover, the cover is bonded with the main body to improve strength of the main body.

12. The portable electronic device of claim 11, wherein the cover comprises a plate body and a peripheral edge, the peripheral edge extends substantially perpendicularly from a periphery of the plate body, a gap is formed between the peripheral edge of the cover and the peripheral wall of the receiving member, the buffer member is positioned at the gap.

13. The portable electronic device of claim 12, wherein the peripheral edge forms a second inclined surface, the resisting surface resists the peripheral wall and the first inclined surface resists the second inclined surface.

14. The portable electronic device of claim 10, wherein the receiving member and the main body are both made of resin selected one or more from a group consisting of polycarbonate (PC), Acrylonitrile Butadiene Styrene (ABS), and their modified materials.

15. The portable electronic device of claim 8, wherein the receiving member further comprises a bottom surface, the peripheral wall extends perpendicularly from a periphery of the bottom surface to form a receiving space with the bottom surface, the display is received in the receiving space.

* * * * *